United States Patent [19]

Hollander et al.

[11] Patent Number: 6,074,089
[45] Date of Patent: Jun. 13, 2000

[54] THERMOELECTRIC PRODUCT AND METHOD

[75] Inventors: Milton Bernard Hollander; William Earl McKinley, both of Stamford; Michael A. Macchiarelli, Jr., Shelton; Shahin Baghai, Trumbull, all of Conn.

[73] Assignee: Omega Engineering, Inc., Stamford, Conn.

[21] Appl. No.: 09/015,928

[22] Filed: Jan. 30, 1998

Related U.S. Application Data

[60] Provisional application No. 60/036,624, Jan. 31, 1997, and provisional application No. 60/053,507, Jul. 23, 1997.

[51] Int. Cl.[7] .................................................... G01K 7/00
[52] U.S. Cl. ............................................ 374/181; 374/171
[58] Field of Search ..................................... 374/171, 181

[56] References Cited

U.S. PATENT DOCUMENTS

| | | | |
|---|---|---|---|
| 3,843,872 | 10/1974 | Shimomura | 374/171 |
| 4,031,530 | 6/1977 | Aneshansley | 374/171 |
| 4,133,700 | 1/1979 | Hollander et al. | 374/181 |
| 4,179,745 | 12/1979 | Wuertele | 374/171 |
| 4,210,024 | 7/1980 | Ishiwatari et al. | 374/171 |
| 4,423,968 | 1/1984 | Nemack, Sr. et al. | 374/181 |
| 5,088,835 | 2/1992 | Shigezawa et al. | 374/181 |
| 5,161,893 | 11/1992 | Shigezawa et al. | 374/181 |
| 5,838,551 | 11/1998 | Chan | 361/818 |

*Primary Examiner*—Randy W. Gibson
*Attorney, Agent, or Firm*—William A. Drucker

[57] ABSTRACT

A thermoelectric cold junction compensator connector module, for use with a thermoelectric device such as a thermistor, thermocouple, or resistance-temperature device, has within a housing a cold junction compensator circuit which has means for linearization of voltage output of the circuit relative to input to the circuit. Preferably the circuit also includes potentiometer means for adjustment of at least one parameter of the circuit, and means for adjustment of its voltage output to correspond to degrees Centigrade and degrees Fahrenheit. In a preferred form there are included within the housing a pair of input terminals shielded by ferrite material against stray electromagnetic induction signals, a printed circuit board which comprises a cold junction compensation circuit, a signal linearization circuit, a converter/amplifier circuit, and a circuit for selectively providing a degree Centigrade and degree Fahrenheit output, a battery power supply, and a battery status indicator with means for bringing it into and out of operation, a plurality of potentiometers for preliminary setting up of the circuits, an on-off switching means for the powered circuits, and output terminal means for connection to, for example, a voltmeter or a voltage recording device. The compact body may have a base portion on which the circuits and other items are mounted, and one or more removable cover portions securable on the base portion.

Further, a thermocouple voltage-to-analog connector is in the form of a compact hand-held module which contains all the components and power supplies for converting an input of thermocouple output voltage to a linear and cold-junction-compensated analog output. A particularly advantageous feature is that an on-board analog-to-digital converter only calculates and provides the linearity correction, necessary for the specific thermocouple at a specific temperature, in the form of a pulse width modulation signal output, so that about 95% of the analog output is derived from the output of a thermocouple amplifier and temperature sensor, and only 5% of the remaining signal is derived from the on-board micro-processor.

1 Claim, 13 Drawing Sheets

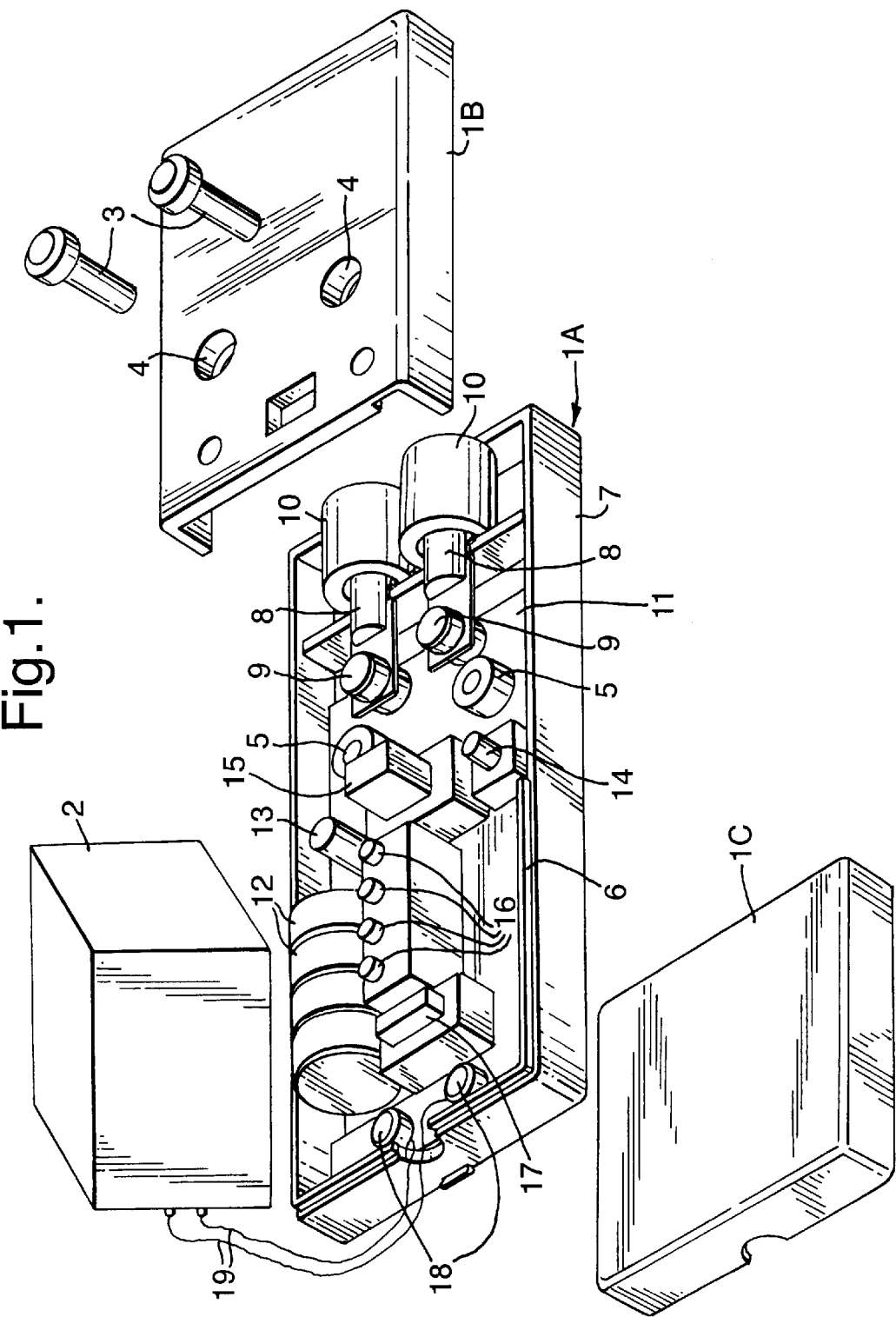

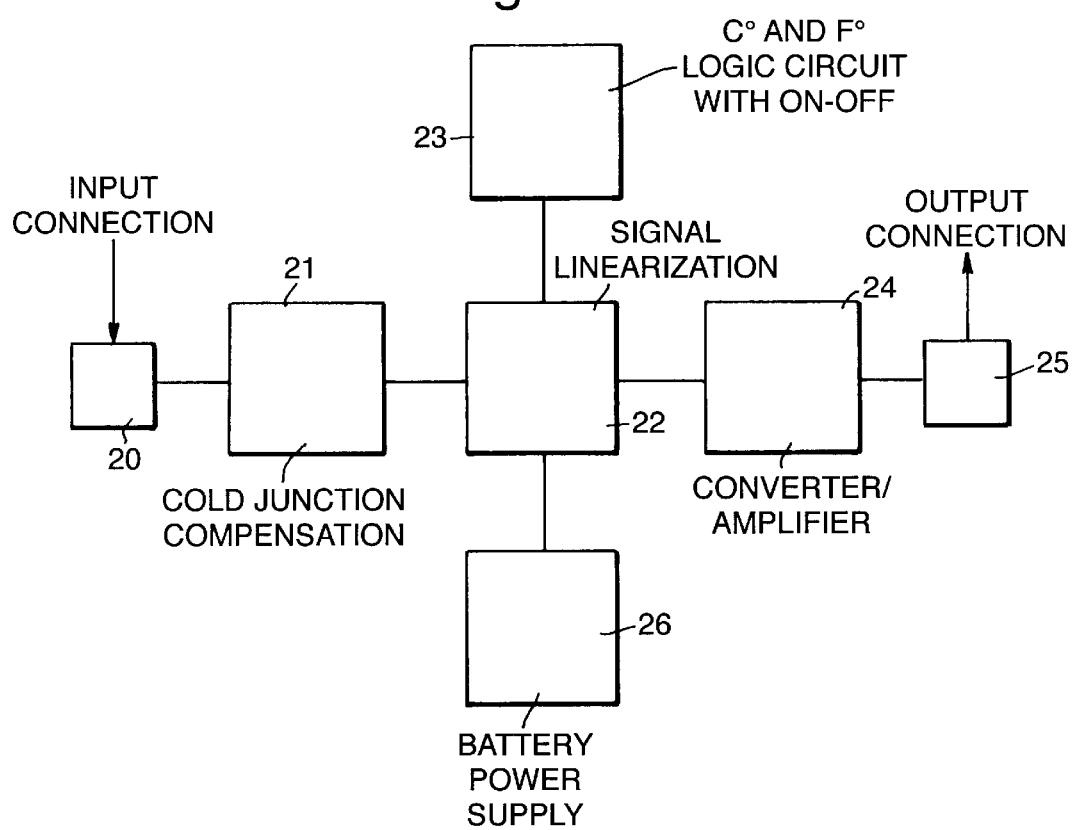

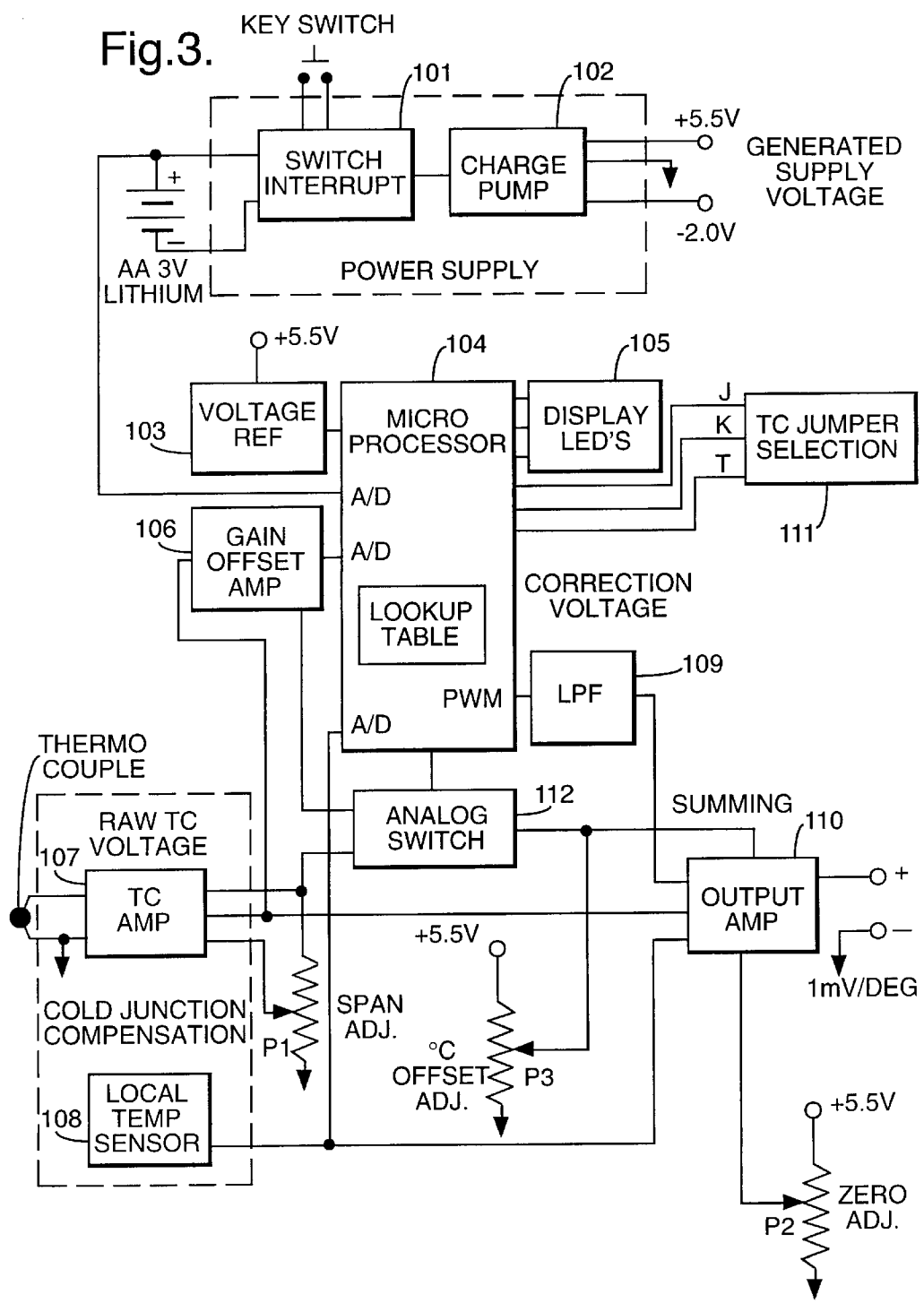

THERMOELECTRIC PRODUCT AND METHOD

This appln. claims benefit of Provisional appln No. 60/036,624 filed Jan. 31, 1997 this appln. claims benefit of provisional appln. No. 60/053,507 filed Jul. 23, 1997.

FIELD OF THE INVENTION

This invention relates to cold junction compensators for use in thermoelectric, thermocouple, or thermistor circuits, and in resistance-temperature circuits, and to methods of use.

BACKGROUND OF THE INVENTION

In thermoelectric circuits it is necessary, for certain measurements, to utilise two identical thermocouples and, whilst keeping one at a reference temperature, to use the other to sense the temperature of an environment to be investigated. Under laboratory conditions, the temperature of the first thermocouple is usually maintained at ice point (zero degrees centigrade) by use of an ice bath, or at some higher fixed temperature by means of a temperature-controlled oven, and the first thermocouple is usually known as the reference or 'cold junction'. The other thermocouple is inserted in the environment under investigation and is known as the 'sensing junction' or 'hot junction'. The known conventional methods for maintaining the first temperature-controlled junction at a constant temperature are satisfactory for use under laboratory conditions, but are impractical in terms of weight, size, cost, power consumption, maintenance, warm-up time and ice replacement or contamination, in many industrial applications, and especially in aircraft and missile applications. The methods of the present invention replace the above methods, as set out herein.

In particular, most practical constructions used hitherto have been of relatively large size and cumbersome in use because of the necessity to include a number of separate items of equipment requiring interconnection with wiring between those items, and also with wiring between the thermocouple junction itself and the indication and/or recording equipment.

In the use of thermoelectric circuits it is desirable to have so-called 'linearization'. This term describes the process by which an electrical circuit converts the highly non linear curve of thermoelectric voltage versus temperature to a linear curve of a device output voltage versus temperature.

Each calibration has in practice a unique non-linear calibration curve. By providing linearization, the user does not need to use a table to relate a linear to a non-linear curve, but can simply measure the output of the device and then know that, for example, 1 milli-volt of output voltage is equivalent to, say, 1 degree Centigrade or 1 degree Fahrenheit of measured temperature.

Similarly in RTD (Resistance Temperature Detectors) and thermistors there is need for correction. The output of an RTD is already linear for output versus temperature, but the output curve is unique, and is offset. With this invention, the provision of linearization ensures that the user can measure the output of the RTD and know that, say 1 milli-volt of output voltage, is equivalent to either 1 degree Centigrade or 1 degree Fahrenheit of measured temperature.

Cold junction compensators for use with thermocouple circuits are disclosed in the following documents:

| US PATENT DOCUMENTS | | | |
|---|---|---|---|
| 1,205,325 | 11/1916 | Clark | 136/222 X |
| 1,228,678 | 6/1917 | Johnson | 136/222 X |
| 1,411,033 | 3/1922 | Jensen | 136/222 X |
| 3,225,597 | 12/1965 | Engelhard | 73/361 |
| 3,650,154 | 3/1972 | Arnett et al | 73/361 |
| 3,916,691 | 11/1975 | Hollander et al | 73/361 |
| 4,133,700 | 1/1979 | Hollander et al | |
| FOREIGN PATENT DOCUMENTS | | | |
| 691809 | 8/1964 | Canada | 73/361 |

Other Publications

Product Bulletin 803-A, Omega Engineering. Inc., 4 pages. Catalog No. C021. Consolidated Omega Devices. Inc., 6 pages.

Avasthy, 'Cold Junction compensation for Thermocouple Sensors' Jul. 1973, pp 211 to 212, Institution of Engineers (India), vol. 53, pt 6.

U.S. Pat. No. 4,133,700 of Hollander et al discloses a cold junction compensator which provides the electrical equivalent of an ice-bath reference thermocouple at a selected temperature, for example zero degrees Centigrade. Input connectors, for engagement with conventional thermocouple units, form thermocouple junctions with conductors connected to a battery-operated Wheatstone Bridge circuit adapted to supply an equal and opposite voltage output compensation for variations in the thermocouple junction output at different ambient temperatures.

OBJECTS OF THE INVENTION

A main object of the present invention is to provide an apparatus to serve as a thermocouple output—to—analog connector module of a compact and easily handled nature.

Another object is to provide such a connector module in which cold junction compensation is provided.

Yet another object is to provide such a connector module in which the voltage output is linearly related to the thermocouple temperature reading.

Yet another object is to provide such a connector module in which the voltage output can readily be related alternatively to degrees Centigrade and to degrees Fahrenheit.

Yet another object is to provide such a connector module in which all the linearity and cold junction compensation corrections are performed by a microprocessor.

A still further object is to provide such a connector module which can be readily programmed for any of the thermocouple types J, K, or T, as explained herein.

It is a further object of the present invention to provide an improved construction of cold junction compensator which is in the form of a relatively small and compact module containing all of the components required for a compensation circuit fully wired and including any necessary power supply, the module being adapted, for example, to include connector means, such as a pair of sockets, for rapid connection and disconnection of a thermoelectric device, and having output provision for a meter and/or recorder.

A still further object of the invention is to provide such a module with included circuitry for linearization of the voltage output of a device so as to be proportional to the temperature being tested.

Yet another object of the invention is to provide such a module with means at least to lower, and preferably to eliminate entirely, any stray electromagnetic induction 'noise' which may be picked up by input leads from the device being used in conjunction with the module.

Still further objects of the invention are to provide methods for obtaining an analog resultant from an electrical output of a thermoelectric device, and for obtaining a linearized analog resultant, and for providing for calibration of said analog resultant in degrees Centigrade and in degrees Fahrenheit, and for providing cold-junction compensation of said analog resultants.

Still further objects and advantages of the invention will be apparent from the description which follows with reference to the accompanying drawings.

SUMMARY OF THE INVENTION

According to the present invention, a cold junction compensator device comprises, on a support. Input terminals for connection to leads of a thermoelectric (thermocouple, thermistor, RTD) device, a printed circuit board carrying the electronic components required for cold junction compensation, and for linearization where applicable, battery means for power supply to the printed circuit components, and output terminals for application of leads to a voltage measuring meter and/or a voltage recorder or to a display which may show a temperature in degrees Centigrade or degrees Fahrenheit The support may further carry any one or more of the following:

(i) means for shielding the input terminals from stray electromagnetic induction noise;
(ii) 'on-off' switching means for the device;
(iii) one or more potentiometers for calibration of the circuitry;
(iv) means for indicating, at the exterior, the status of the power supply battery means;
(v) switch means for changing the output of the device to read in degrees Centigrade or degrees Fahrenheit.

The hand-held support may have one or more removable and replaceable cover portions for easy access to the interior thereof.

The compensator may be included in a module having input sockets or input plugs to coact with plugs or sockets of conventional thermocouple units. The compensator and battery may be encapsulated, or an accessible switch may be included in the battery circuit.

A compensator device with linearization according to this invention is adapted to the management of thermoelectric components including:-ceramic semi conductors, thermocouples, silistors, thermistors, RTD's (resistance temperature detectors) and thyristors. Electric currents are converted to readouts in degrees of temperature; and temperature can be selected to control electrical performance of operating equipment.

The invention is adapted to temperature sensors for, measurement, compensation, and control and to flow sensing, gas analysis, liquid level/viscosity sensing, infrared measurement and microwave power management. It is used in linearized networks and bridge circuits. It is useful for instrument calibration.

BRIEF DESCRIPTION OF THE DRAWINGS

In the drawings:

FIG. 1 is a composite perspective view of a hand-held cold junction compensator module, with its base and two cover portions shown separated, together with a representative meter and/or voltage recording means;

FIG. 2 is a block diagram of the circuit of the cold junction compensator module;

FIG. 3 is a circuit block diagram of a connector module;

DETAILED DESCRIPTION OF THE PREFERRED EMBODIMENTS

Figure 4A:
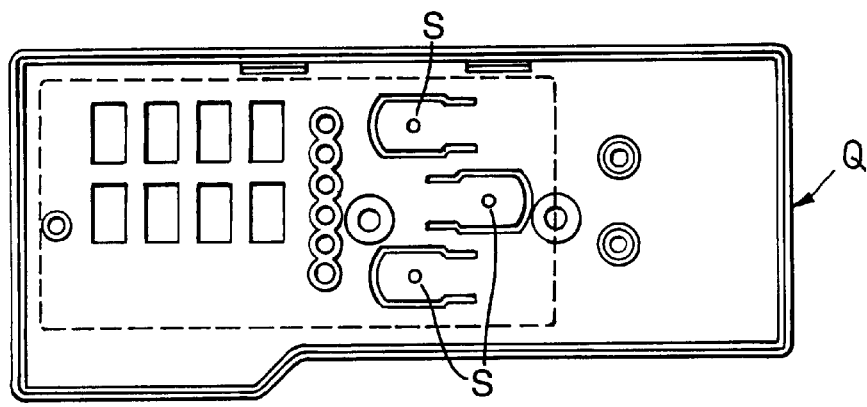
FIG. 4A is a plan view of the module, with cover removed.
Figure 4B:
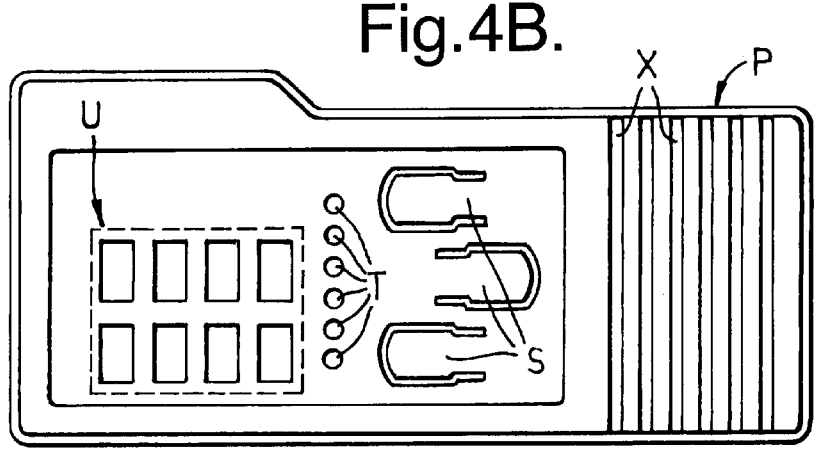
FIG. 4B is a plan view of a cover for the module.
Figure 4C:
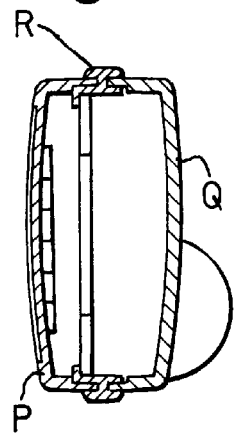
FIG. 4C is a transverse section of the module casing taken at a first position of the casing.
Figure 4D:
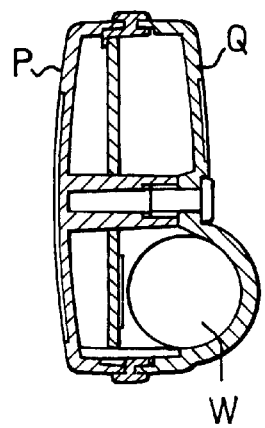
FIG. 4D is a transverse section of the module casing taken at a second position of the casing.
Figure 4E:
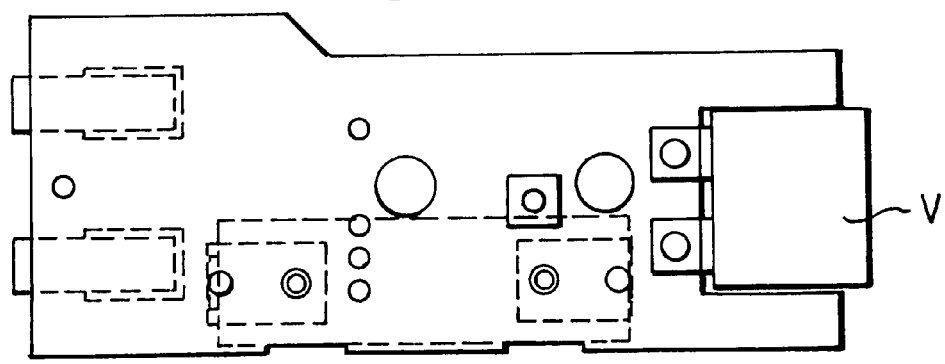
FIG. 4E is an underplan view of the module.
Figure 4F:
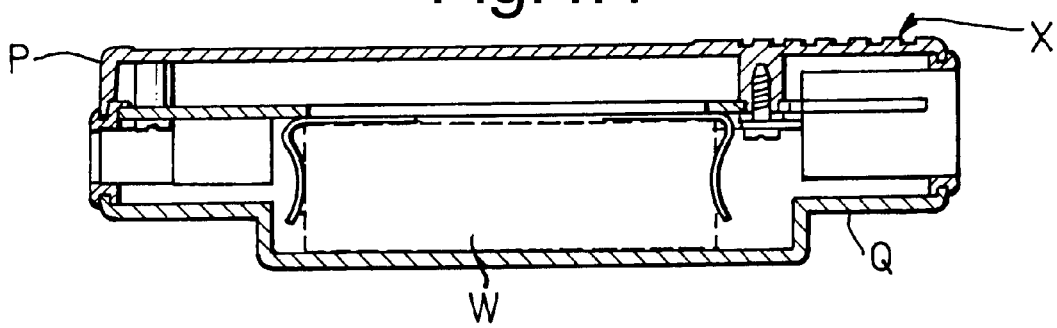
FIG. 4F is a central vertical longitudinal section through the module casing.
Figure 4G:
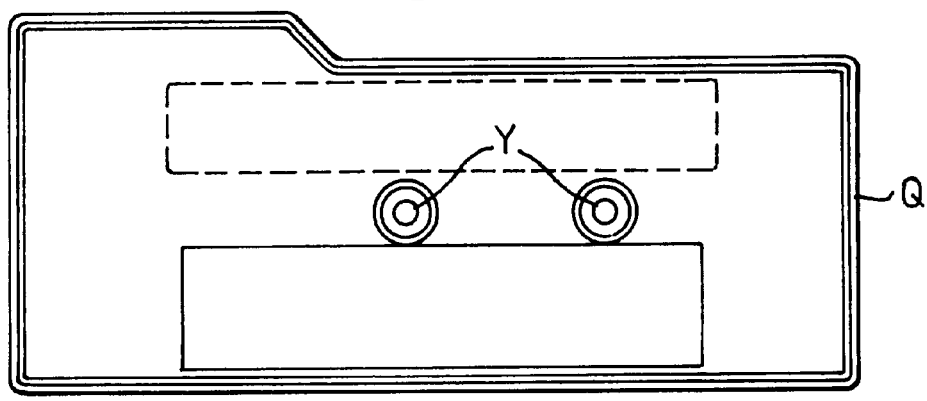
FIG. 4G is an underplan view of the module casing.
Figure 4H:
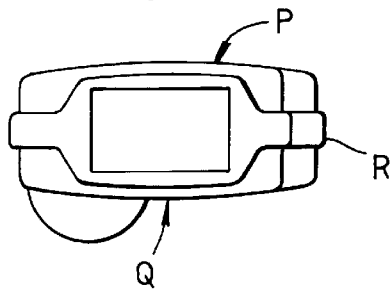
FIG. 4H is an end view from one end of the module casing.
Figure 4I:
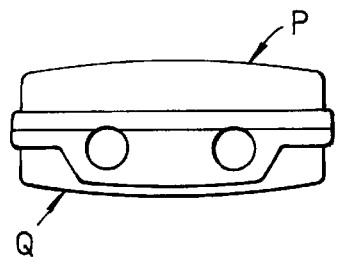
FIG. 4I is another end view of the module casing, with part omitted.
Figure 4J:
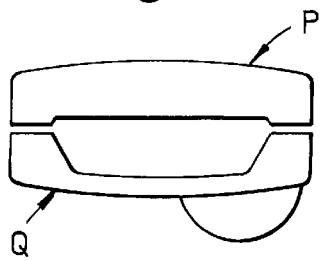
FIG. 4J is an end view of the entire module casing.
Figure 4K:
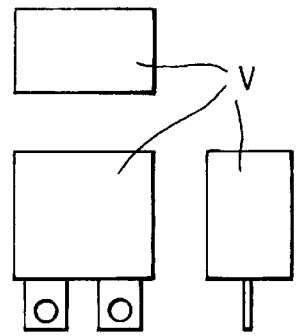
FIG. 4K shows plan, end and side views of an insertable plug for connection to the module.
Figure 5:
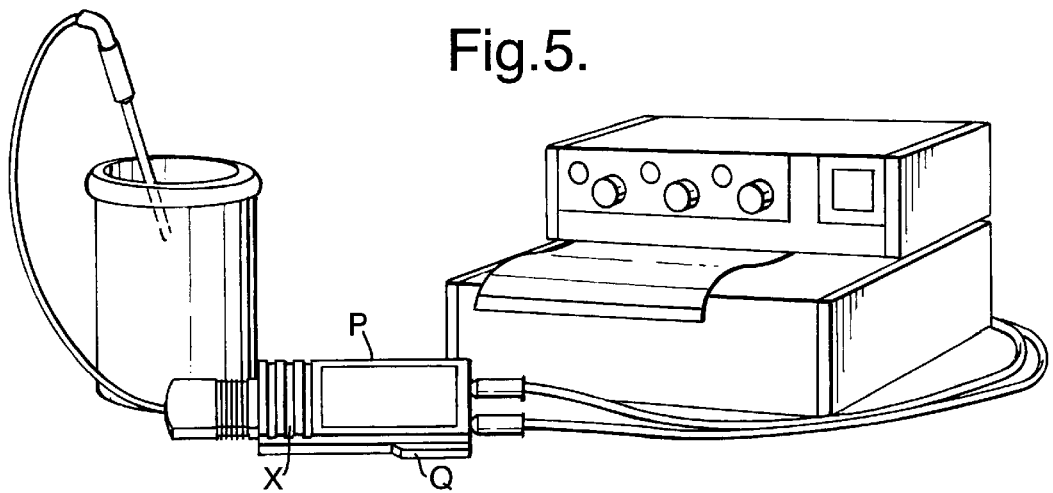
FIG. 5 is a perspective illustration of the module in use, in conjunction with a thermocouple, and a read-out/recording apparatus.
Figure 6:
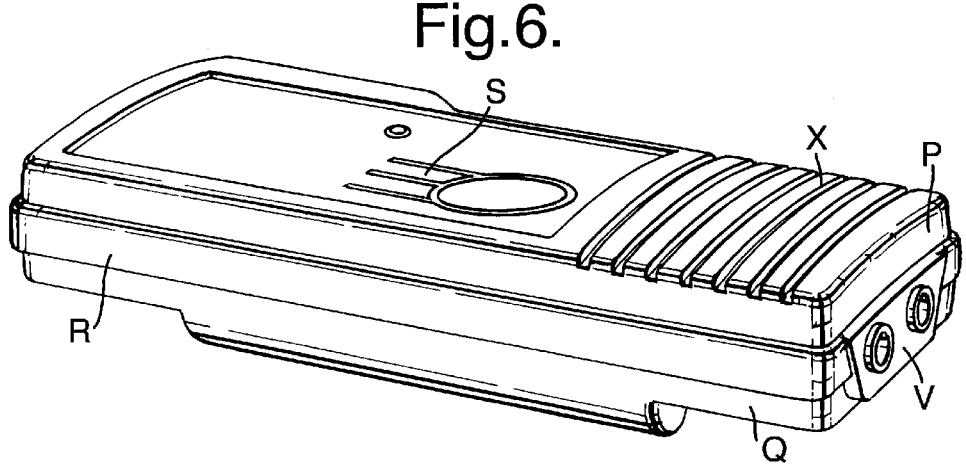
FIG. 6 is a perspective view of the module, seen from one side and one end.
Figure 7:
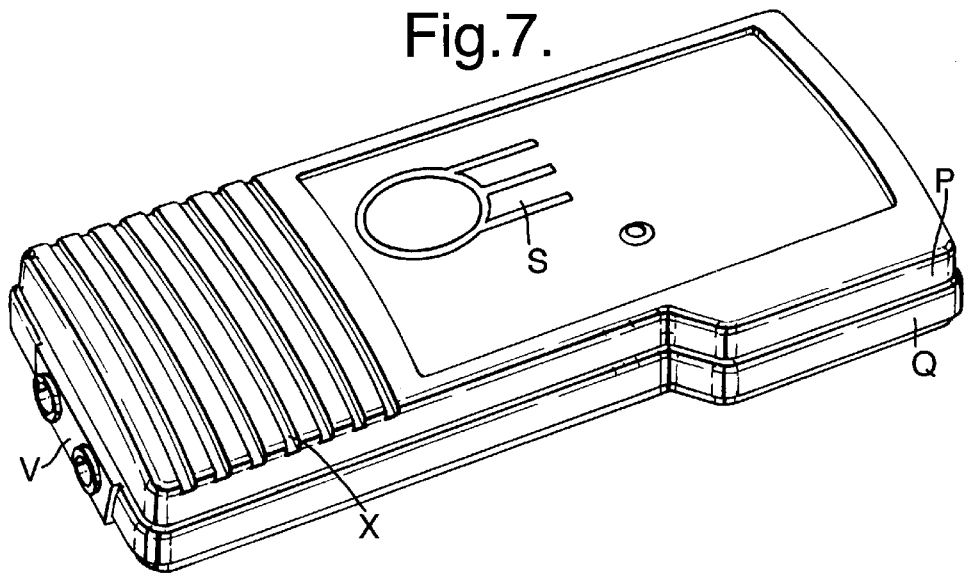
FIG. 7 is a perspective view of the module, seen from the other side and other end.
Figure 8:
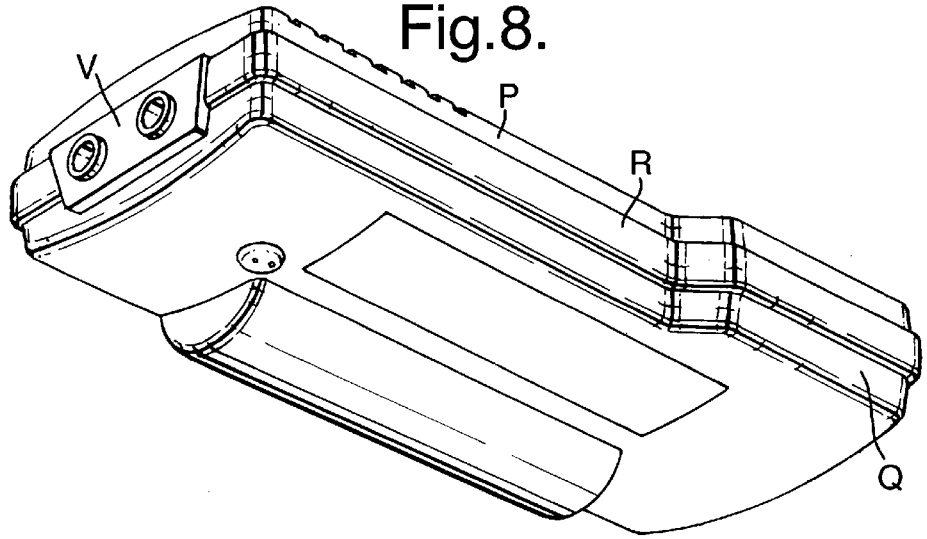
FIG. 8 is a perspective view of the module seen from the underside.

Referring to FIG. 1 of the drawing, a cold junction compensator module comprises a base 1A, a first cover portion 1B, and a second cover portion 1C. A volt, or other, meter and/or a recording device, is denoted by reference 2.

The cover portion 1B can be secured in position on the base 1A by two screws 3 which pass through holes 4 in the cover portion 1B and engage threaded bosses 5 of the base 1A. The cover portion 1C can be secured on the base 1A by any conventional means, for example by making a sliding fit on side wall ribbing 6 which may be appropriately undercut.

The base 1A has an encircling wall 7 which is cut away (not shown) at the right-hand end in this figure to permit access of two differently-sized male plug pins of a thermoelectric device to appropriate female sockets 8 mounted on respective terminal posts 9 secured on the base 1A. Each female socket 8 is surrounded by a respective ferrite sleeve 10 to provide shielding from stray electromagnetic interference.

Within the base 1A there is secured a printed circuit board 11 having appropriate circuitry for a compensation and linearization circuit. Also on the board there is provided means for mounting batteries 12 supplying power to the circuitry. A 'battery status' indicator (L.E.D) 13 can be brought into use when required by means of a battery status switch 14. A main on-off switch for the circuitry is shown at 15. Potentiometers 16 allow for calibration of the circuitry. A switch 17 permits changing of the output of the module to read in terms of degrees Centigrade or degrees Fahrenheit, as the case may be. Output terminals 18 can be connected by respective leads 19 to the meter or recording device 2.

FIG. 2 shows a block diagram of the cold junction compensator module. Input connection 20 (corresponding to items 8, 9 and 10 of FIG. 1) has its output end connected to the cold-junction compensation portion 21 of the printed circuit board. The output of the compensation circuit is connected to the signal linearization circuit 22 of the printed circuit board and the output therefrom can be varied to read in terms of degrees Centigrade or degrees Fahrenheit by operation of the logic circuit 23. The selected and linearized output passes to a converter/amplifier 24, from which the output passes to output connection means 25 coupled to, for example, a voltmeter or voltage recording device (not shown). A battery supply 26, with on-off switching and battery-status indicator, provides power.

As compared with previous encapsulated cold junction compensators, the present invention has the following unique features and functions:

(i) It has the ability to linearize the thermoelectric output to a convenient 1 milli-volt per degree Centigrade or 1 milli-volt per degree Fahrenheit curve; also the output signal can be calibrated to a specific unit of voltage or current per degree Centigrade or Fahrenheit and the linearized output signal is compatible with instrumentation such as millivolt chart recorders, VOM, and other display and recording devices.

(ii) It includes the use of ferrite cores to protect the thermoelectric input signals from stray RFI radiation;

(iii) It includes a battery-life indicator which actuates automatically, as distinct from requiring the user to actuate a switch for that purpose;

(iv) It can be arranged to provide for 'Banana Plug' output connectors, as distinct from screw terminals;

(v) Rubber gaskets may easily be included to make the device water resistant;

(vi) The inclusion of calibration potentiometers which are immediately accessible to the user and can be used to check and adjust the calibration in the field;

(vii) The module can be provided with a high input impedance, which:-
  a) Allows for the use of thermocouples with high resistance while keeping the signal loss to a minimum;
  b) Permits the use of thermocouples with long leads;
  c) Permits the use of thermocouples made from fine gauge wire where speed of response is desired.

Where there is a high input impedance, the input circuitry will be extremely sensitive to RFI or EMI, and the built-in RFI or EMI suppression provides the necessary protection.

(viii) The module can be provided with a low impedance output, and,-
  a) With the output signal being kept close to ground potential there is less chance of stray electromagnetic signals being induced into the signal leads;
  b) A low impedance output will allow the signal to be transmitted over a greater distance with less chance of RFI or EMI.

(ix) The input and output can be balanced, which:-
  a) Helps prevent ground loops;
  b) Cuts down on interference affecting the input and output signal due to cancellation of induced signals.

Referring now to FIGS. 3 to 8, the apparatus shown in detail is a hand-held thermocouple-to-analog connector module. It converts a thermocouple input to a linear, compensated, analog output. The unit provides either 1 mV/Degree Fahrenheit or 1 mV/Degree Centigrade analog output. For example, if the thermocouple input to the module is measuring 400 Degrees Fahrenheit temperature, the unit provides 400 mV analog output.

The apparatus is microprocessor based. All the linearity and cold junction compensation corrections are performed by a microprocessor. The microprocessor also interfaces with a key switch, and provides the functions of the switch. It also performs all the logical functions and it drives all of a plurality of LED's on board. LED=light emitting diode.

FIG. 3 shows the circuit block diagram. The unit is powered by a 3 volts lithium AA size battery. A switch interrupt circuit 101 interfaces with a key switch and a microprocessor. This circuit controls the power to the rest of the board. A charge pump circuit 102 converts the 3 volts input to +5.5 V and −2.0V outputs. These voltages are used to power the rest of the circuit. A voltage reference circuit 103 provides a stable and precise +5 volts output to the rest of the board. A thermocouple amplifier circuit 107 amplifies the thermocouple input to a high level signal. The high level signal goes through a second stage of amplification and offset correction at amplifier 106. A microprocessor 104 converts the output of the second stage amplifier 106 to a digital signal. TC=thermocouple.

A thermocouple jumper selection 111 programs the microprocessor for any of the three types of thermocouples J, K or T. Based on the thermocouple selection, the microprocessor programs an analog switch 112 to set the gain and the offset for the corresponding thermocouple. The analog switch also provides the proper offset selection of an output amplifier 110 to switch between 1 mV/degree Fahrenheit and 1 mV/degree Centigrade output.

TC=Thermocouple
J=Iron—constantan
K=Chromel—alumel
T=Copper—constantan

There is a surface mount temperature sensor that measures the temperature of the cold junction. The microprocessor takes the signal from the gain offset amplifier 106 and the temperature sensor 108 and by using the internal look-up tables, it calculates the amount of correction the input signal needs and it provides a pulse width modulation signal output. This signal goes through a low pass filter circuit 109 to get converted to a DC signal. This DC signal is then summarized with the output signal from the thermocouple amplifier 107 and the temperature sensor 108. The output of the output amplifier 110 provides a linear, and compensated, analog signal output (1 mV/degree).

One unique feature of this apparatus is that the microprocessor, which has a 4 channel, 8-bit analog to digital converter (A/D) on board, only calculates and provides the linearity correction necessary for the specific thermocouple at a specific temperature in the form of a pulse width modulation signal output. As a result, about 95% of the analog output comes directly from the output of the thermocouple amplifier 107 and the temperature sensor 108 and only 5% of the remaining signal comes from the microprocessor.

This arrangement is preferred over the conventional way of digitizing an analog signal and providing a linearized signal output which is controlled by the microprocessor completely.

The advantage of this arrangement is that the microprocessor is only providing the linearity correction signal and as a result it is possible to obtain the same level of accuracy for the analog output with an 8-bit A/D versus a 10 or 12 bit A/D that controls the analog output completely.

The unit can be calibrated with a thermocouple simulator. In order to calibrate the unit, three potentiometers have to be adjusted. P1 adjusts the temperature span. P2 adjusts the zero offset of the thermocouple. P3 adjusts for the degree Centigrade offset. This allows proper conversion between mV/degree Fahrenheit and mV/degree Centigrade analog output.

FIGS. 4A to 4J show the design concept of the casing. The casing consists of two plastic shells P, Q and a rubber gasket, R, which is sandwiched between the two shells. This provides a water splash proof, sealed design. The case has 3 flex fingers, S. The way the three finger areas are designed, makes these areas flexible. With a graphic layer covering this area, and a momentary switch underneath the flex finger, this provides the membrane key action. The case also has 6 holes for positioning LED'S, on the PC board. It also has a partition area, U, for adding a liquid crystal display as an enhancement. The case incorporates a uni-connector, V. This provides both an SMP and an OST thermocouple connection.

The lower shell Q provides a cradle for the AA size battery W. The top shell also has a series of decorative grooves X, which give the case special style and look. The two shells are assembled using mounting screws in holes Y.

The following is a summary of the feature of a preferred embodiment of the apparatus:

(a) A thermocouple to analog converter provides a linear compensated 1 mV/degree Fahrenheit or Centigrade analog output;
(b) microprocessor based design;
(c) one button (key switch) operation;
(d) Off—On (1 mV/degree Centigrade)—On (1 mV/degree Fahrenheit)—Off;
(e) The unit can be calibrated for three types of thermocouple inputs;
(f) J—from −100 to +750 degree Centigrade;
(g) K—from −100 to +1250 degree Centigrade;
(h) T—from −100 to +350 degree Centigrade;
(i) There are three indicating LED's on board;
(j) 1—Green LED for mV/degree Centigrade. It flashes once every 3 seconds in normal operation.
2—Green LED for mV/degree Fahrenheit. It flashes once every 3 seconds in normal operation.
3—Red LED for low battery indication. In normal operation, it is off. When the battery voltage is low, it flashes once every second. When the battery voltage gets too low, the microprocessor shuts the power off completely;
(k) If the thermocouple input opens; the analog output can be driven upscale or downscale. At the same time the corresponding green LED flashes faster (every sec).
(l) It operates from a single AA size 3 volts lithium battery. The battery should last about 3 months under continuous operation.
(m) The PC board is designed to pass EMC requirements. The board is multi-layer. The two internal layers are the ground plane and the power plane. The two outside layers are the signal layers.

Figure 9:
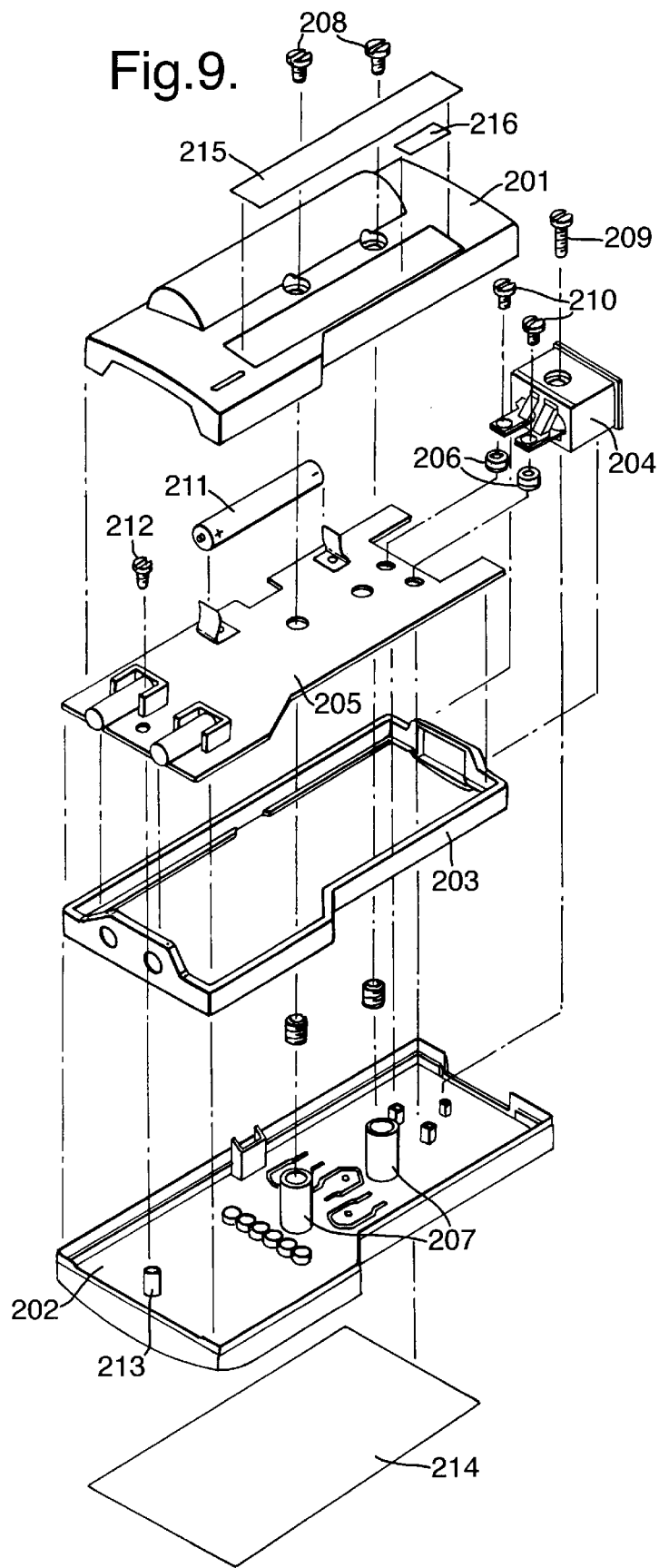
FIG. 9 is a perspective view of parts of another embodiment of cold junction compensator module, with the parts seen in separated condition.
Figure 10A:
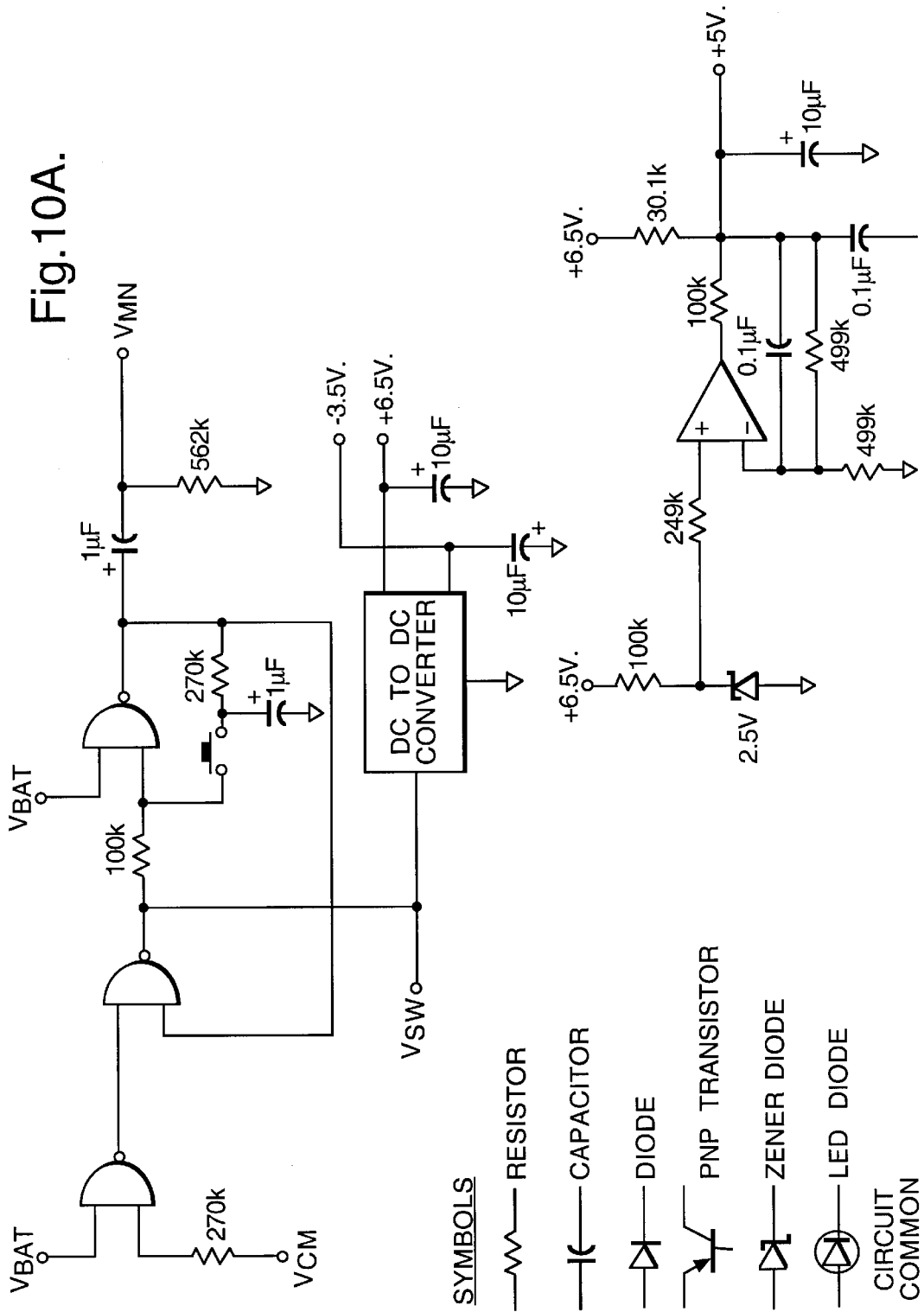
FIGS. 10A, 10B, 10C and 10D are respective portions of a circuit schematic of the module of FIG. 9.
Figure 10B:
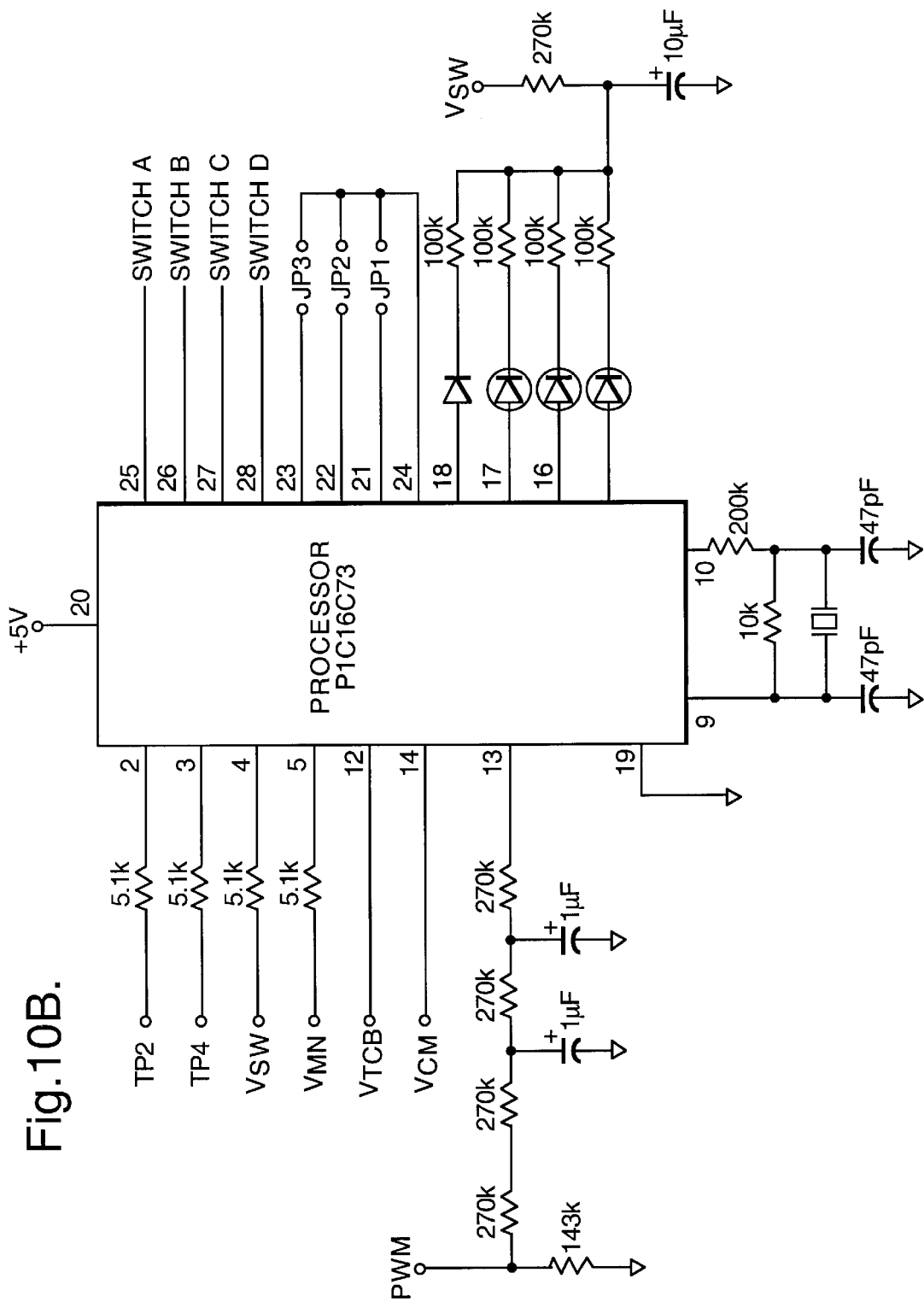
Figure 10C:
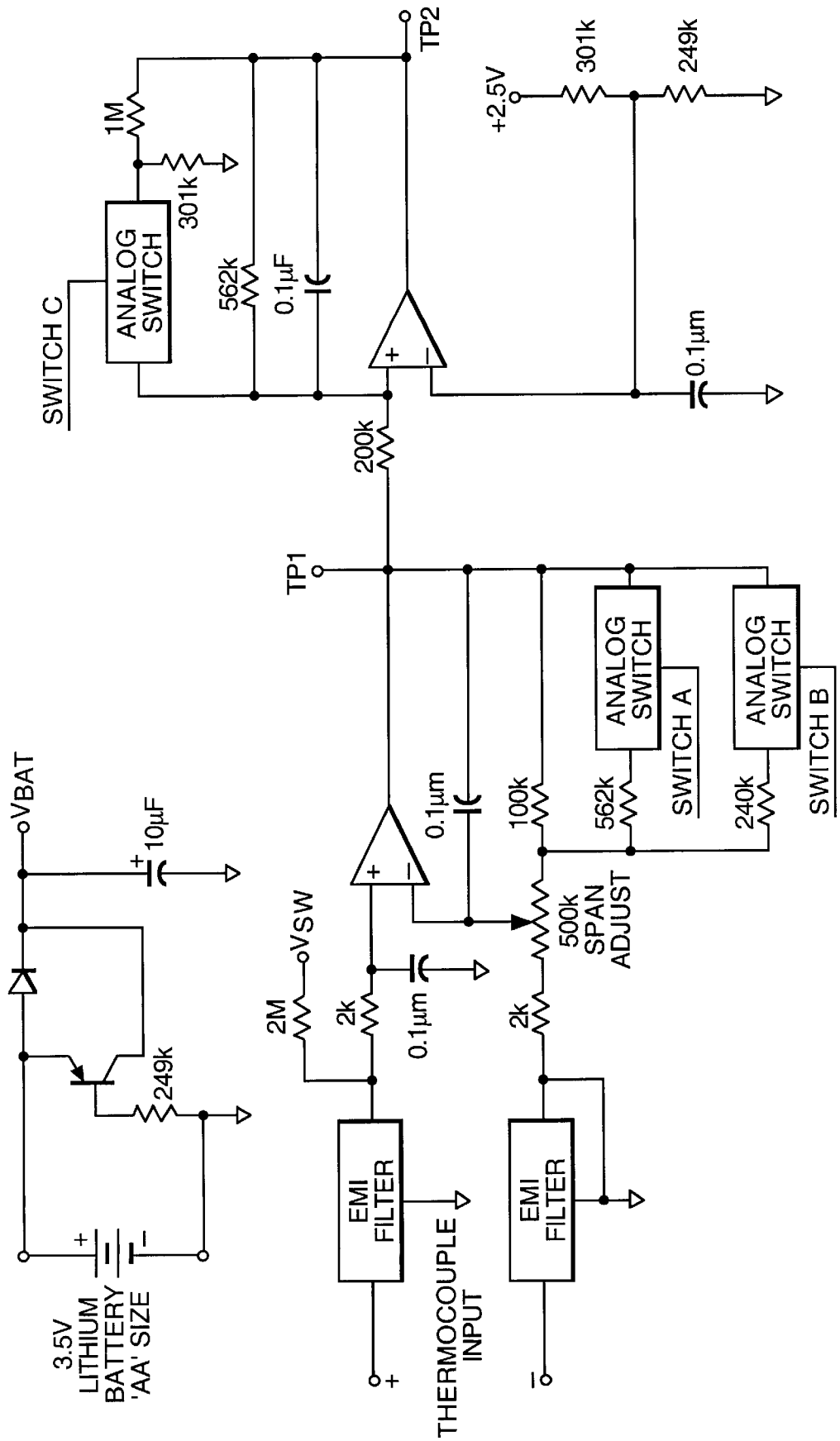
Figure 10D:
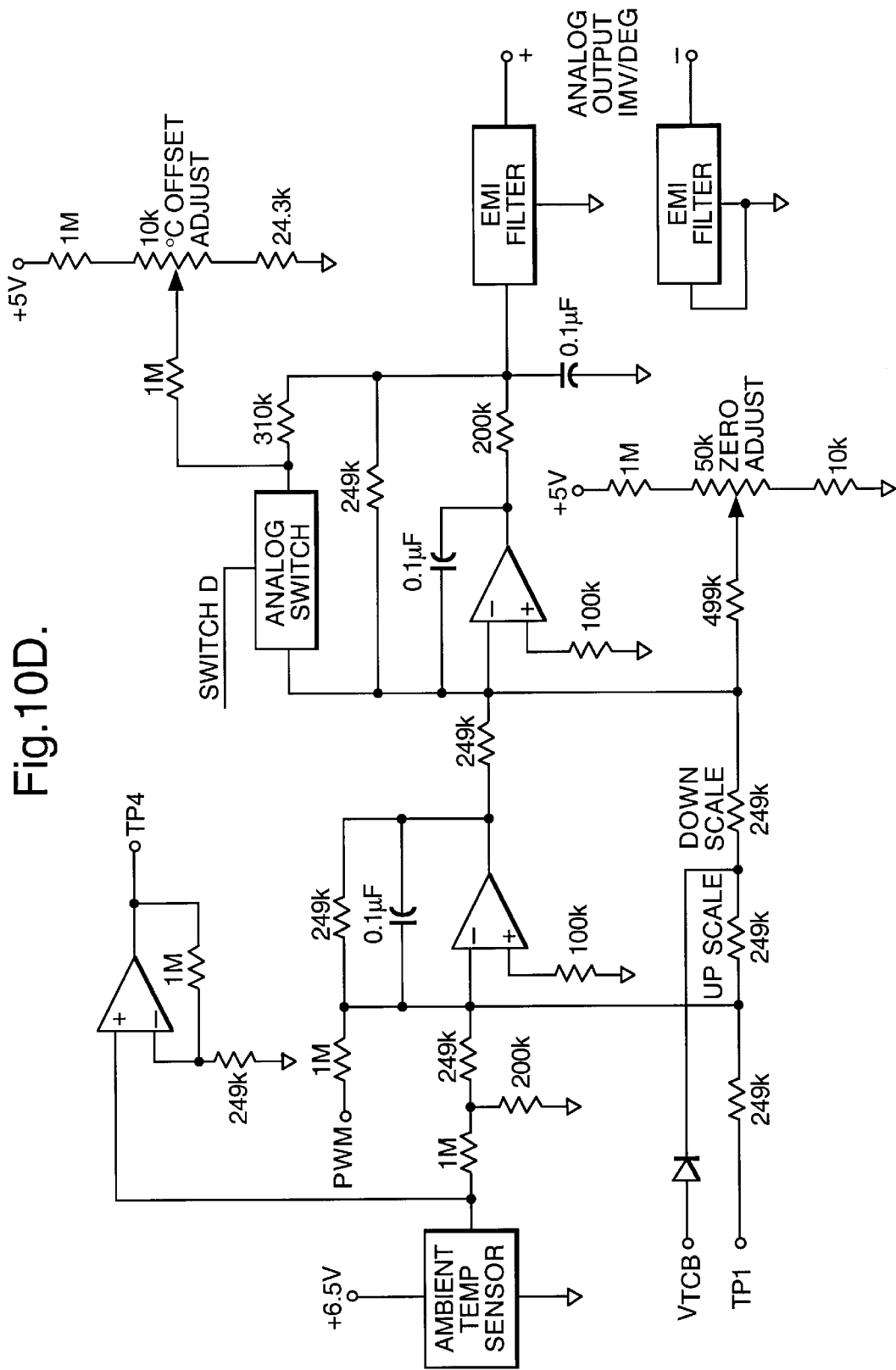

Referring to FIG. 9, a base 201 has a cover 202 and the base and cover fit together with a gasket 203. 204 is a modified uni-connector, and 205 is a PC board which seats within the assembly of base and cover. Items 206 are spacers. Items 207 are brass inserts which are used in the mechanical securing together of the base and covers, by means of screws 208. Screw 209 engages in a socket on base 202 to secure the uni-connector 204 in position. Screws 210 engage through openings in connector tabs of uni-connector 204, and through openings in PC board 205, and are threaded into mounting pillars on cover 202. A battery 211 can be engaged between connector clips on the PC board 205. A screw 212 engages through an opening in the PC board 205 and engages in a threaded mounting pillar 213 on the cover 202. 214 is a front label for the assembly, and 215 is a rear label, and 217 is a serial/model number label.

FIGS. 10A, 10B, 10C, and 10D collectively show a circuit schematic of the module of FIG. 9.

Figure 11:
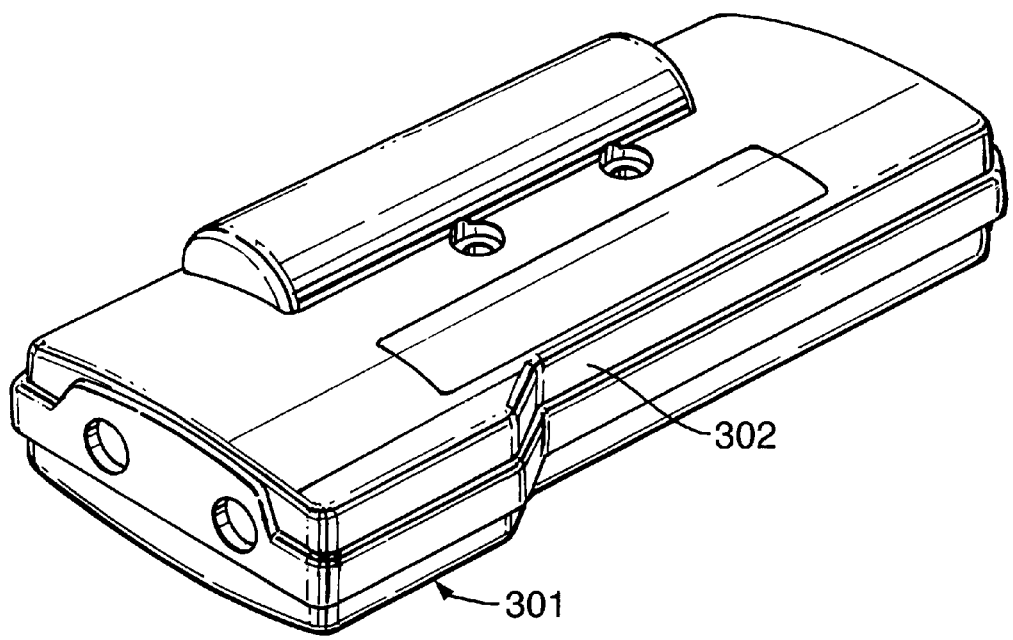
FIG. 11 is a perspective view of a casing of the module equipped with an encircling coloured strip of resilient material for sealing and identification purposes, e.g. in a contrasting yellow colour.

FIG. 11 is a perspective view of a modified form of casing for the module, the casing 301 (shown empty of all other items of the module) having an encircling sealing strip 302 of resilient material which is made of a distinctive colour, for example yellow, for the easy identification of the module.

The invention also provides a method for obtaining an analog resultant from an electrical output of a thermoelectric device which comprises steps of feeding said electrical output to a linearization means, and feeding a linearized voltage output from said linearization means to a display means. The method may include the further step of converting said linearized output from said linearization means selectively to a display of degrees Centigrade and to a display of degrees Fahrenheit. There may be a still further step of calibrating said linearized voltage output to a desired temperature scale.

The invention also provides a method for obtaining a cold-junction compensated analog resultant from an electrical output of a thermoelectric device, providing cold-junction compensation of said electrical output, converting said cold-junction compensated electrical output into a linearized output, and feeding said output to a display.

We claim:

1. In a hand-held thermoelectric cold junction compensator connector module comprising:
(i) a thermocouple connector housing;
(ii) a cold junction compensator circuit mounted within said housing; and including input and output means;
(iii) input terminal means on said housing connected to said input means or said compensator circuit;
(iv) a signal linearization circuit mounted within said housing and including input mean and output means, said input means being connected to said output means of said compensator circuit;
(v) converter/amplifier means in said housing having input means and output means, said input means being connected to said output means of said signal linearization circuit;
(vi) output terminal means on said housing connected to said output means of said converter/amplifier means;
(vii) a logic circuit in said housing connected to said signal linearization circuit and constructed to provide selectively degree Centigrade and degree Fahrenheit correction to the output of said signal linearization circuit;
(viii) battery power supply means disposed within said housing and connected to supply power to said cold junction compensator circuit, to said signal linearization circuit, to said logic circuit, and to said converter/amplifier circuit, the improvement comprising:
said logic circuit further including
a microprocessor having an eight bit analogue to digital converter which provides both linearity correction, as a pulse width modulation signal, and also provides thermoelectric cold junction compensation.

* * * * *